United States Patent [19]

Skaggs

[11] 4,060,934
[45] Dec. 6, 1977

[54] WATER TENDER

[76] Inventor: Leonard L. Skaggs, 1830 Taft Highway, Signal Mountain, Tenn. 37377

[21] Appl. No.: 726,599

[22] Filed: Sept. 27, 1976

[51] Int. Cl.$^2$ ............................................. A01G 27/00
[52] U.S. Cl. .................................... 47/79; 137/403; 239/67; 251/144; 251/294; 251/303
[58] Field of Search .................................... 47/79–81, 47/48.5; 239/63–65, 67; 251/144, 298, 299, 294, 303; 137/403

[56] References Cited

U.S. PATENT DOCUMENTS

| 53,337 | 3/1866 | Regester | 251/299 |
|---|---|---|---|
| 392,371 | 11/1888 | Skinner et al. | 251/144 |
| 1,606,278 | 11/1926 | Wheaton | 251/279 X |
| 2,809,661 | 10/1957 | Gillespie et al. | 251/144 X |
| 3,085,364 | 4/1963 | Chapin | 47/79 X |
| 3,168,797 | 2/1965 | Patassy | 47/79 |
| 3,293,799 | 12/1966 | Keller | 47/48.5 |
| 3,900,134 | 8/1975 | Larson | 47/79 X |

FOREIGN PATENT DOCUMENTS

| 841,340 | 5/1939 | France | 47/79 |
|---|---|---|---|
| 550,799 | 5/1932 | Germany | 47/79 |
| 2,336,739 | 3/1974 | Germany | 47/79 |
| 83,441 | 3/1935 | Sweden | 47/79 |
| 116,795 | 7/1946 | Sweden | 47/79 |

Primary Examiner—Clifford D. Crowder
Assistant Examiner—James R. Feyrer
Attorney, Agent, or Firm—Lamont Johnston

[57] ABSTRACT

An automatic water tender is disclosed which waters a plant in accordance with the amount of moisture which has evaporated or has been transpired from the plant. The apparatus comprises a support base upon which a horizontal pivot shaft is pivotally mounted. A cantilever platform is rigidly mounted to the pivot shaft and a counter weight is mounted to the pivot shaft opposite to the cantilever platform. A plant container is supported by the cantilever platform, which contains the plant to be watered. The plant container on the platform is counter-balanced about the pivot shaft by the counter weight. A fluid reservoir is mounted on the support base in an elevated position with respect to the plant container. A valve means is mounted on the fluid reservoir and is operatively connected to the pivot shaft, for controllably conducting fluid from the reservoir to the plant container in response to the pivotal motion which the pivot shaft undergoes when the counter weight overbalances the platform. In this manner, the plant in the container is automatically watered after a predetermined loss of weight of water by the plant through evaporation and plant transpiration.

1 Claim, 3 Drawing Figures

WATER TENDER

FIELD OF THE INVENTION

The invention disclosed herein relates to plant watering apparatus and more particularly relates to automatic plant watering apparatus responsive to water loss by the plant.

BACKGROUND OF THE INVENTION

Prior art automatic plant watering apparatus has generally suffered from several deficiencies. One type of automatic plant watering apparatus is an elevated reservoir with a spring loaded valve therein which is actuated by the loss of weight of water by the plants in containers supported by the spring. One significant deficiency of this prior art apparatus in that the force which the spring brings to bear upon the valve increases as the room temperature increases. This causes the plants to be overwatered on hot days, beyond the increased amount of water needed to compensate for the higher evaporative rate. In addition, the prior art apparatus can service only a limited number of plant containers since all plant containers serviced must be mounted on the apparatus itself. Other prior art automatic plant watering apparatus suffer from the deficiences that they require complex mechanical mechanisms to operate, are bulky and unsightly in a domestic environment, and are generally expensive to fabricate and to operate.

OBJECTS OF THE INVENTION

It is therefore an object of the invention to automatically water plants in an improved manner.

It is another object of the invention to automatically water a plant in a manner which is relatively insensitive to the temperature of the surroundings.

It is yet another object of the invention to automatically water a plant by sensing the amount of water weight loss in the plant container, in an improved manner.

It is yet a further object of the invention to automatically water a plurality of plants by sensing the weight loss of a single plant.

SUMMARY OF THE INVENTION

These and other objects, features and advantages of the invention are accomplished by the water tender invention disclosed herein. The invention is an automatic plant watering apparatus which comprises a support base upon which is pivotally mounted a horizontal pivot shaft. A cantilever platform is rigidly mounted to one side of the pivot shaft and a counter weight is mounted opposite to the cantilever platform on the pivot shaft. A plant container is supported by the cantilever platform and contains a plant to be watered. The plant container and platform are counter-balanced about the pivot shaft by the counter weight. A fluid reservoir is mounted on the support base in an elevated position with respect to the plant container. A valve means is mounted on the fluid reservoir and is operatively connected to the pivot shaft for controllably conducting fluid from the reservoir to the plant container in response to the pivotal motion which the pivot shaft undergoes when the counter weight overbalances the platform. In this manner the plant in the container is automatically watered after a predetermined loss of weight of water by the plant and its container through evaporation and plant transpiration.

DESCRIPTION OF THE FIGURES

These and other objects, features and advantages of the invention will be more particularly appreciated with reference to the accompanying figures.

DISCUSSION OF THE PREFERRED EMBODIMENT

The water tender invention disclosed herein is a device for automatically watering plants which are grown in the home or in a greenhouse. The apparatus automatically dispenses a predetermined amount of water whenever the plant and its container have lost a predetermined weight of water through evaporation or plant transpiration. The apparatus is simple in design and operation, easy to fabricate and, in use, will eliminate the problems of overwatering or underwatering valuable plants.

Figure 1:
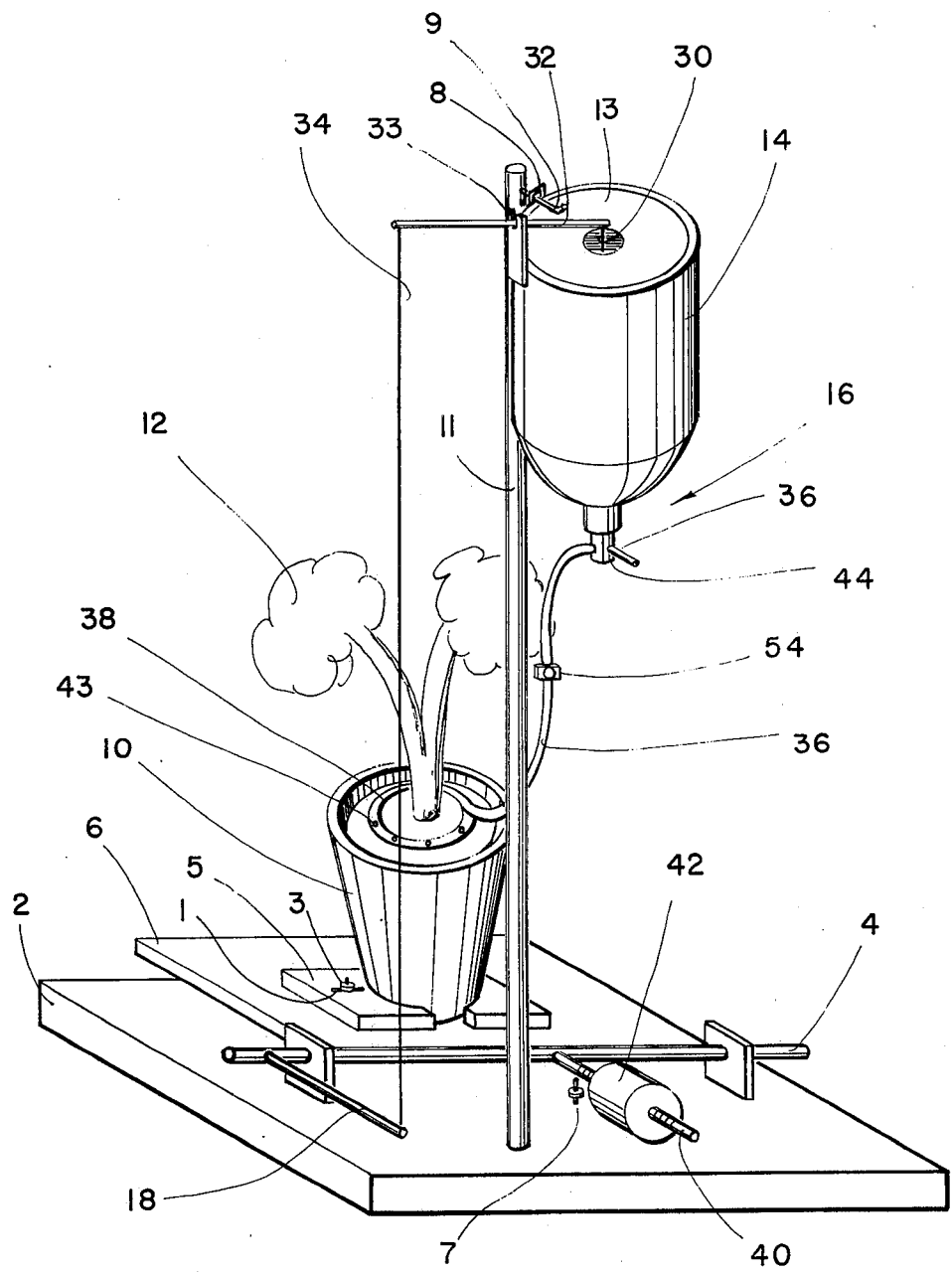
FIG. 1 is an overall view of the water tender invention.

FIG. 1 shows an overall view of the water tender apparatus. A support base 2 has pivotally mounted thereon a horizontal pivot shaft 4. A cantilever platform 6 is rigidly mounted to the pivot shaft 4 over the base 2. A counter weight 42 is mounted to the pivot shaft 4 opposite to the cantilever platform 6 and its motion about the pivot 4 is limited by the adjustable stop 7, mounted on the base 2.

The counter weight 42 is mounted on a threaded rod 40 which is rigidly mounted on the pivot shaft 4 opposite the platform 6. The counter weight 42 has a threaded hole therethrough, threadably engaged to the threaded rod 40, for adjusting the counterbalancing torque about the pivot shaft 4. The rod 40 is graduated for setting the counter weight 42.

A plant container 10 is supported by the cantilever platform 6 and contains a plant 12 to be water. The platform 6 and plant 12 are counter-balanced about the pivot shaft 4 by the counter weight 42. Container 10 is clamped onto platform 6 by means of clamp 5 which can be adjusted to accomodate various sized pots by means of the slot 1 and adjusting nut 3.

A fluid reservoir has a braket 8 mounted on the side thereof, through which the hook 9 passes, for removably mounting the reservoir onto the post 11, in an elevated position with respect to the plant container 10. A valve means 16 is mounted on the fluid reservoir 14 and is operatively connected to the pivot shaft 4, for controllably conducting fluid from the reservoir 14 to the plant container 10 in response to the pivotal motion which the pivot shaft 4 undergoes when the counter weight 42 overbalances the platform 6. By adjusting the position of the weight 42 on the rod 40, weight changes through the growth of the plant 12 can be compensated for and the quantity of fluid dispensed per application can be adjusted.

Figure 2:
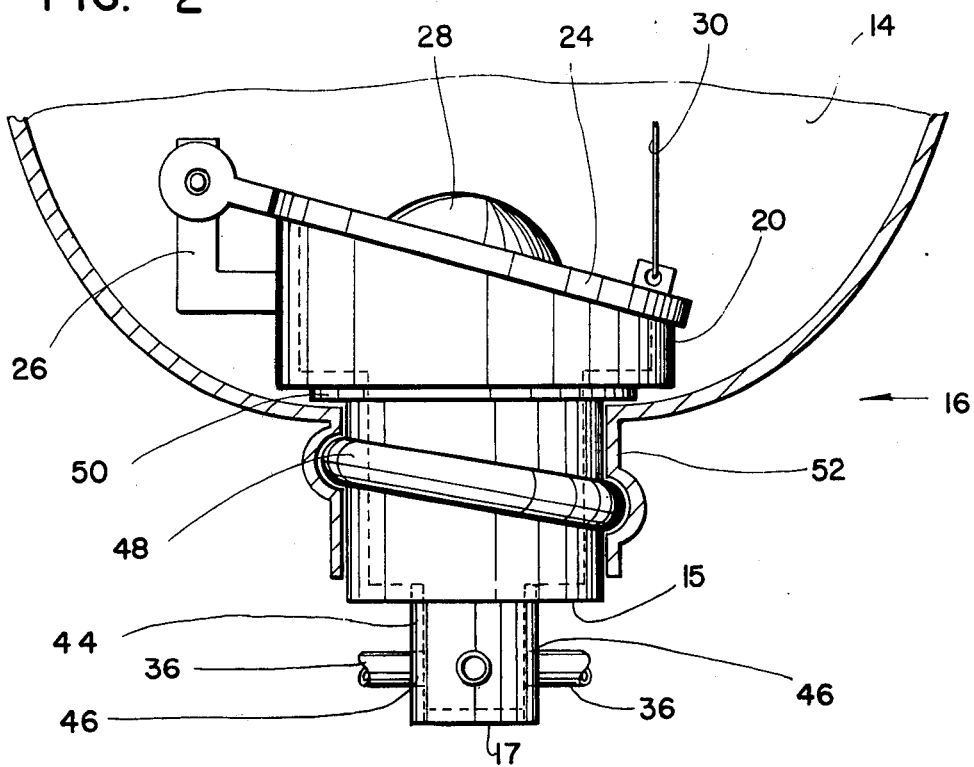
FIG. 2 is a more detailed view of the reservoir for the water tender with a side of the valve means therein.
Figure 3:
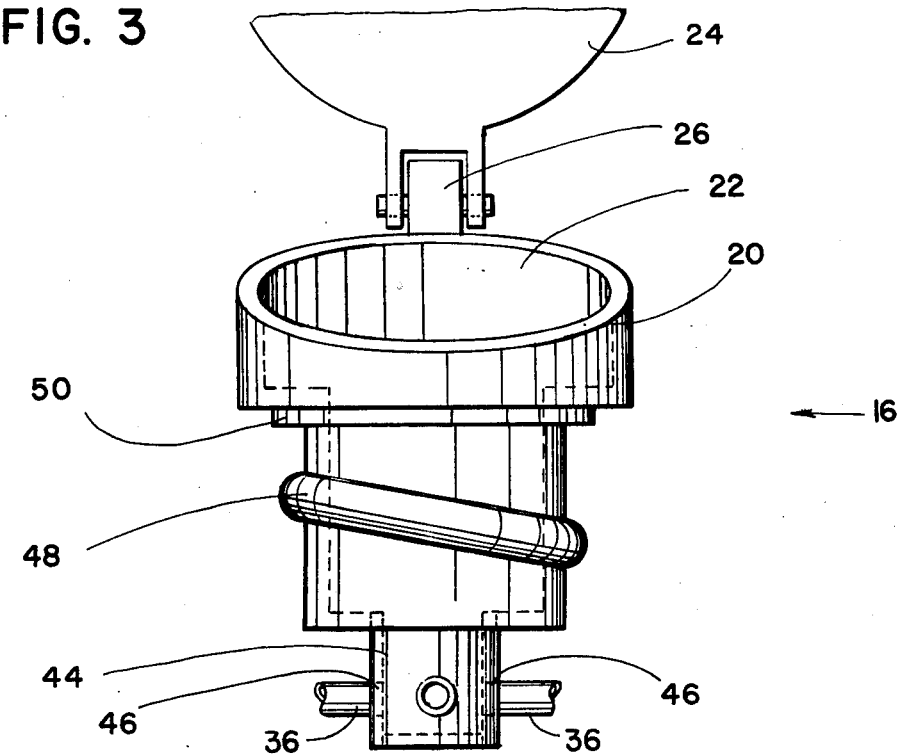
FIG. 3 is a front view of the valve means with the valve open.

The valve means 16 shown in more detail in FIGS. 2 and 3, comprises a circular valve seat 20 mounted in the bottom of the reservoir 14, forming an opening 22 through which the fluid in the reservoir 14 may drain. The flapper valve 24 has one end pivotally mounted on the mount 26 to the valve seat 20, for sealably engaging the opening 22 in the seat 20 by the natural force of gravity. The flapper valve 24 has a weight 28 mounted thereon for pressing the flapper valve 24 tightly against the valve seat 20, thereby closing the valve.

A funicular connection 30, such as a chain or string, connects the flapper valve 24 to the rocker lever 32 which is pivotally mounted by means of pivot mount 33 mounted on the side of the fluid reservoir 14. The funicular connection 30 passes through an opening in the lid 13 of the reservoir 14, connecting to a first end of the rocker lever 32.

An actuating lever 18 is rigidly mounted on a first end to the pivot shaft 4 and has a second end which is connected by means of a second funicular connection 34, or string, to a second end of the rocking lever 32. In this manner, an operative connection is made between the valve means 16 and the pivot shaft 4. Fluid from the reservoir is controllably conducted from the reservoir 14 to the plant container 10 in response to the pivotal motion which the pivot shaft 4 undergoes when the counter weight 42 overbalances the platform 6. This occurs when the plant 12 and its container 10 have lost a predetermined quantity of water through evaporation or plant transpiration. The actuating lever 18 is moved by the pivot shaft 4 which, in turn, opens the flapper valve 24 through the action of the rocking lever 32.

A flexible tube 36 is connected at a first end to the opening in the valve seat 22 and has a second end in the plant container 10, for conducting fluid from the valve means 16 to the plant 12. The tube 36 has a loop 38 formed on the second end which has holes 43 perforating its periphery, for uniformly watering the soil in the plant container 10.

A manifold fluid distribution block 44 has an inlet port connected to the opening 22 of the valve seat 20 and a plurality of outlet ports 46, each connecting one of a plurality of the delivery tubes 36 to block 44. In this manner a plurality of plants may be automatically watered by sensing the weight loss of water which has been evaporated and transpired from the single plant 12 in the plant container 10. Thus the invention can be adapted to water hundreds of plants in a greenhouse without the aid of expensive electrical devices. Pinch valves 54 may be added to the respective delivery tubes 36 to regulate the amount of water that will be dispensed to each pot.

In the preferred embodiment, manifold block 44 may be a large diameter polyethylene tube fastened to a circular hole in the bottom 15 of the valve seat 20. The bottom of the tube 44 may be sealed with a plug 17. The outlet ports 46 may be small diameter holes in the side of the tube 44, through which the delivery tubes 36 may be inserted with a water-tight slip fit.

The valve seat 20 has a lower threaded shank portion 48 which engages a corresponding threaded portion 52 of the reservoir 14. A rubber washer 50 located around the threaded shank 48 will seal the valve seat 20 to the bottom of the reservoir 14. Reservoir 14 may be removed from hook 9 for the purpose of screwing the threaded shank portion 48 of valve seat 20 into threaded portion 52 of reservoir 14. The lid 13 screws onto the top of reservoir 14, so that it can be removed to enable the insertion of valve means 16.

The valve means 16 can be formed out of injection molded or cast plastic such as polystyrene and the reservoir can be made out of blown polyethylene. The flapper valve 24 can be made out of synthetic rubber.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, falling within the scope of the intended claims. I claim:

1. An automatic plant watering apparatus, comprising:

a support base;

a horizontal pivot shaft pivotally mounted on said support base;

a cantilever platform rigidly mounted to said pivot shaft;

a counter weight mounted to said pivot shaft opposite to said cantilever platform;

a plant container supported by said cantilever platform containing a plant to be watered, counterbalanced about said pivot shaft by said counter weight;

a fluid reservoir mounted on said support base in an elevated position with respect to said plant container;

valve means mounted on said fluid reservoir, operatively connected to said pivot shaft, for controllably conducting fluid from said reservoir to said plant container in response to the pivotal motion which said pivot shaft undergoes when said counter weight overbalances said platform;

an actuating lever rigidly mounted to said pivot shaft on a first end, with a second end being said operative connection to said valve means;

a valve seat of said valve means having a lower threaded shank portion which engages a corresponding threaded portion in the bottom of said reservoir, forming an opening through which the fluid in said reservoir may drain;

a flapper valve of said valve means having one end pivotally mounted to said valve seat, for sealably engaging said opening in said seat by the natural force of gravity;

a weight mounted on said flapper valve, for pressing said flapper valve tightly against said seat, thereby closing said valve means;

a funicular connection between said flapper valve and said actuating lever, being said operative connection between said valve and said pivot shaft;

a rocker lever, pivotally mounted on top of said fluid reservoir;

said funicular connection passing through an opening in the top of said reservoir and connecting to a first end of said rocking lever;

a second funicular connection between a second end of said rocking lever and said second end of said actuating lever to provide an operative connection between said valve means and said pivot shaft is made;

a manifold fluid distribution block mounted in said valve means, being a circular hollow tube fastened to a circular hole in the bottom of said valve seat, having outlet ports in the side thereof through which delivery tubes may be inserted, each conducting fluid to one of a plurality of plants;

whereby a plurality of plants may be automatically watered by sensing the weight loss of water which has been evaporated and transpired from the plant in said plant container.

* * * * *